United States Patent [19]

Livneh

[11] Patent Number: 4,657,087
[45] Date of Patent: Apr. 14, 1987

[54] VEHICLE CONTROL SYSTEM INCLUDING VEHICLE WITH STEERING AND ELEVATION CONTROL RELATIVE TO A FILAMENT

[76] Inventor: Zvi Livneh, 3290 Avondale Court, Windsor, Ontario, Canada, N9E 1X6

[21] Appl. No.: 496,967

[22] Filed: May 23, 1983

Related U.S. Application Data

[63] Continuation-in-part of Ser. No. 464,466, Feb. 7, 1983, abandoned.

[51] Int. Cl.$^4$ ................ A01B 63/114; A01B 69/04
[52] U.S. Cl. ............................................. 172/3; 172/4; 172/26; 180/131; 318/587; 114/144 A
[58] Field of Search ................ 172/3, 4, 23, 26; 180/131; 104/244.1; 318/587; 446/130, 134, 135, 136; 114/144 A, 144 B

[56] References Cited

U.S. PATENT DOCUMENTS

| | | | |
|---|---|---|---|
| 2,500,475 | 3/1950 | Staaf | 40/426 |
| 2,555,785 | 6/1951 | Cook | 273/86 B |
| 2,618,888 | 11/1952 | Hoff | 446/3 |
| 2,639,545 | 5/1953 | Pastorius | 446/136 |
| 2,663,967 | 12/1953 | Mathis | 446/135 |
| 2,668,389 | 2/1954 | Morrison | 446/136 |
| 2,673,421 | 3/1954 | Leonard | 446/136 |
| 2,690,626 | 10/1954 | Gay et al. | 446/130 |
| 3,169,598 | 2/1965 | Finn-Kelcey et al. | 172/3 X |
| 3,294,178 | 12/1966 | Lawson et al. | 172/3 |
| 3,369,516 | 2/1968 | Pierce | 114/144 B |
| 3,468,379 | 9/1969 | Rushing et al. | 172/2 |
| 3,606,933 | 9/1971 | Rushing et al. | 172/3 X |
| 3,669,208 | 6/1972 | Brooke | 318/587 X |
| 3,679,019 | 7/1972 | Hobday et al. | 180/131 X |
| 3,783,550 | 1/1974 | Andrews | 446/484 |
| 3,942,087 | 3/1976 | Maisch et al. | 318/587 |
| 4,185,712 | 1/1980 | Bulger | 180/131 |
| 4,258,813 | 3/1981 | Rubel | 318/587 X |

Primary Examiner—Richard T. Stouffer
Attorney, Agent, or Firm—Mitches & Co.

[57] ABSTRACT

In a particular species of the preferred embodiment, the invention contemplates a land traveller such as a farm tractor pulling a passive load such as a plough, disc or the like. A control device for directing or controlling the path of travel of the vehicle over a field, and also regulating or controlling the depth of penetration of the plough or disc into the surface of the ground according to a predetermined depth irrespective of the terrain profile. The path control system consists of locating in a predetermined way, a track whose position is sensed by an electromagnet, and the relative position of the magnet is sensed by appropriate devices such as resistence measuring devices (strain gauges or variable resistors or reostats), photoelectric devices whose values are decoded through a microprocessor whereby steering of the prime mover along the predetermined path is maintained.

11 Claims, 26 Drawing Figures

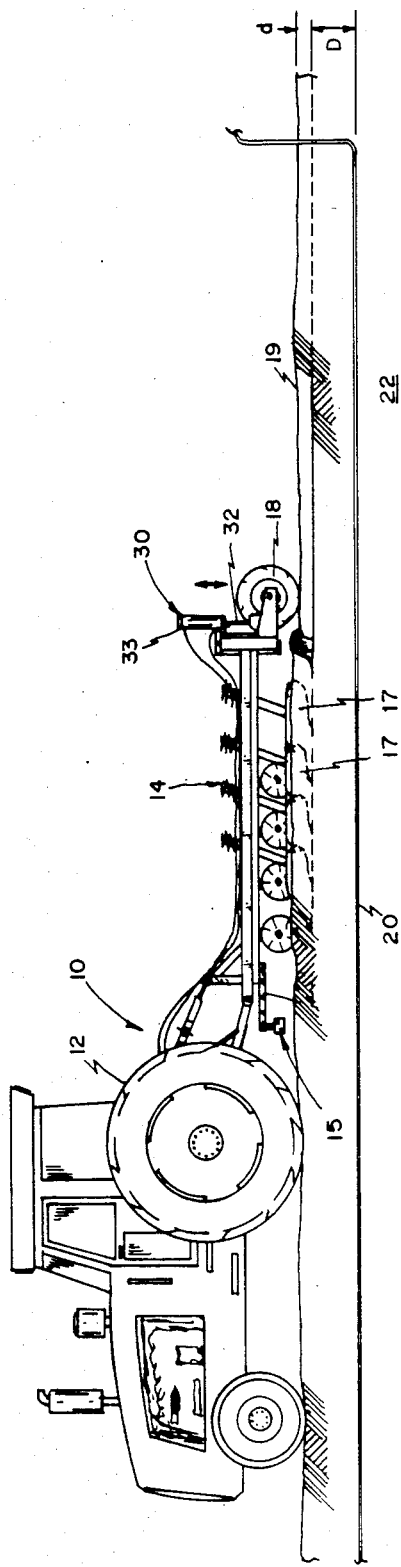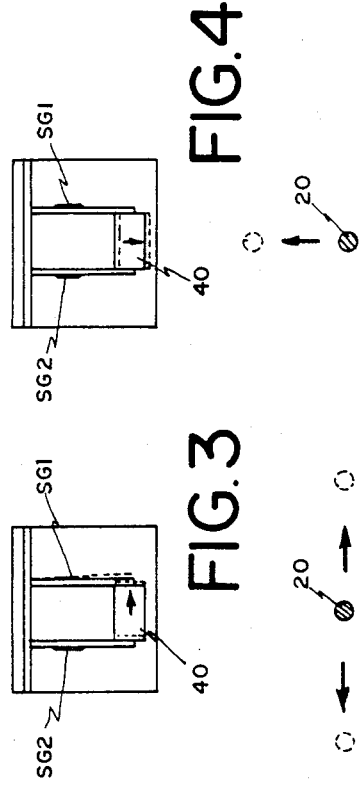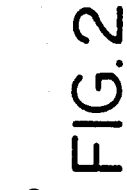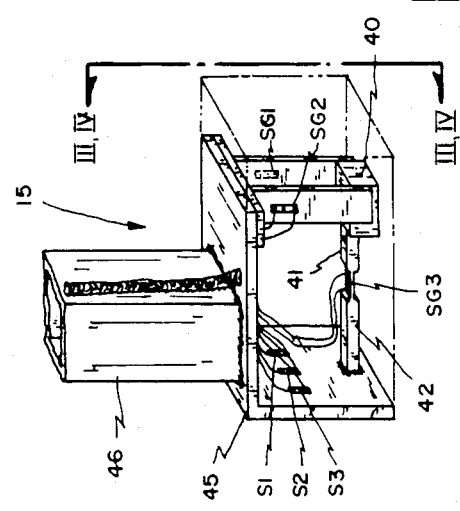

VEHICLE CONTROL SYSTEM INCLUDING VEHICLE WITH STEERING AND ELEVATION CONTROL RELATIVE TO A FILAMENT

This is a continuation-in-part application of Ser. No. 464,466 filed Feb. 7, 1983, now abandoned.

This invention relates to a tracking system for vehicles and the like.

More particularly to a tracking means partially terrainly positioned by which a land traveller such as a vehicle or tractor, or a marine traveller, such as a boat or other floating device, or even a lighter than air traveller, dirigible, may be dynamically controlled and positioned by directionaly controlling the same.

In the preferred embodiment, and in the preferred variant thereof, a means may be either positionally located at or within an altitude or depth as may be predetermined for the particular case.

In a particular species of the preferred embodiment, the invention contemplates a land traveller such as a farm tractor pulling a passive load such as a plough, disc or the like, and means for directing control of the path of travel of the same over a field, and also for regulating or controlling the depth of penetration of the plough or disc means into the surface of the ground according to a predetermined depth irrespective of the surface profile of the terrain. In another embodiment, the sensor regulates the lateral distance between the predetermined path and the actual path of travel.

The invention therefore contemplates a vehicle control system comprising (a) a filament of metalic material position in juxtaposition with the travelling surface, so as to trace out a predetermined course of travel;
(b) a prime mover mounted in a vehicle adapted to travel over the surface and having means for steering the same to follow said course of travel;
(c) a magnet means mounted in a housing carried by the vehicle, that is magnetically responsive to the location of the said filament;
(d) a first position sensing means, affixed to the magnetic means, and mounted in the housing for sensing lateral positioning, relative to the housing of said magnetic means;
(e) first means responsive to the first position sensing means for driving said means for steering whereby to direct the travelling path of the prime mover in parallel to the path or course of the metalic filament.

The invention additionally contemplates a magnetic rocker sensor, with magnetic sensing means spacially disposed in a common plane, and switch means activated by the relative angular position of said sensor.

The invention further additionally contemplates a vehicle control system comprising (a) a filament, whose composition has ingredients selected from, a ferrous, ferric, or metallic material, located in three dimensional space so as to trace out a predetermined course of travel;
(b) a prime mover mounted in the vehicle and having means for steering and for regulating the relative elevational position of the same so as to follow said course;
(c) a magnet means mounted in a housing carried by the vehicle, that is magnetically responsive to the location of the said filament;
(d) a first position sensing means, affixed to the magnetic means, and mounted in the housing for sensing lateral and elevational positions, relative to the housing of said magnetic means; and,
(e) first means responsive to the first position sensing means for driving said means for steering and for elevational positioning, whereby to direct the travelling path of the vehicle along the path of the filaments.

The invention will now be described by way of example and reference to the accompanying drawings in which:

FIG. 1 is a side elevational view of the preferred embodiment in operation.

FIG. 2 is a perspective of one embodiment of a sensory device used to control both the path of travel and the depth penetration; while that of FIG. 10 is a similar view of an alternative embodiment.

FIGS. 3, 3A, 4 and 4A respectively are explanatory sections through FIG. 2.

Figure 5:
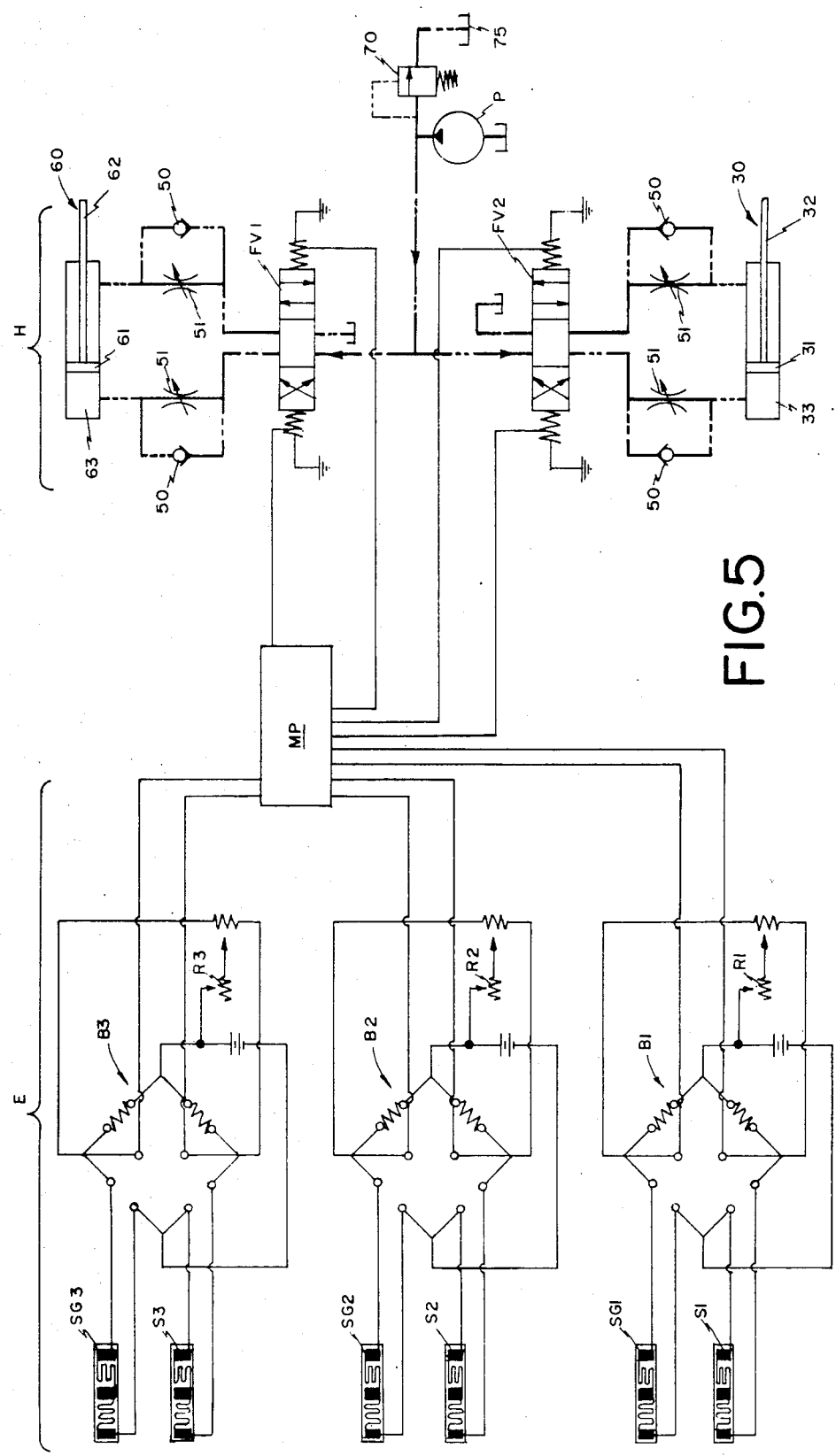

FIG. 5 is the electronic and hydraulic circuit diagram showing means to control the path of travel and the depth penetration of the preferred embodiment of FIG. 2.

Figure 6A:
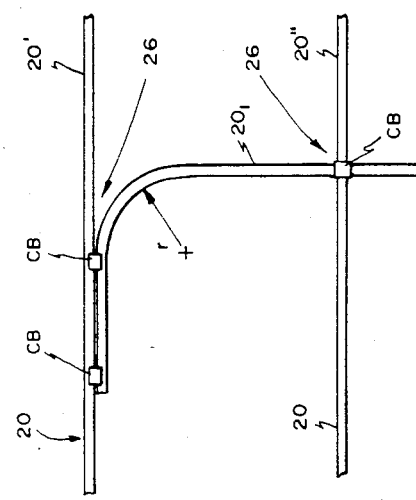
Figure 6:
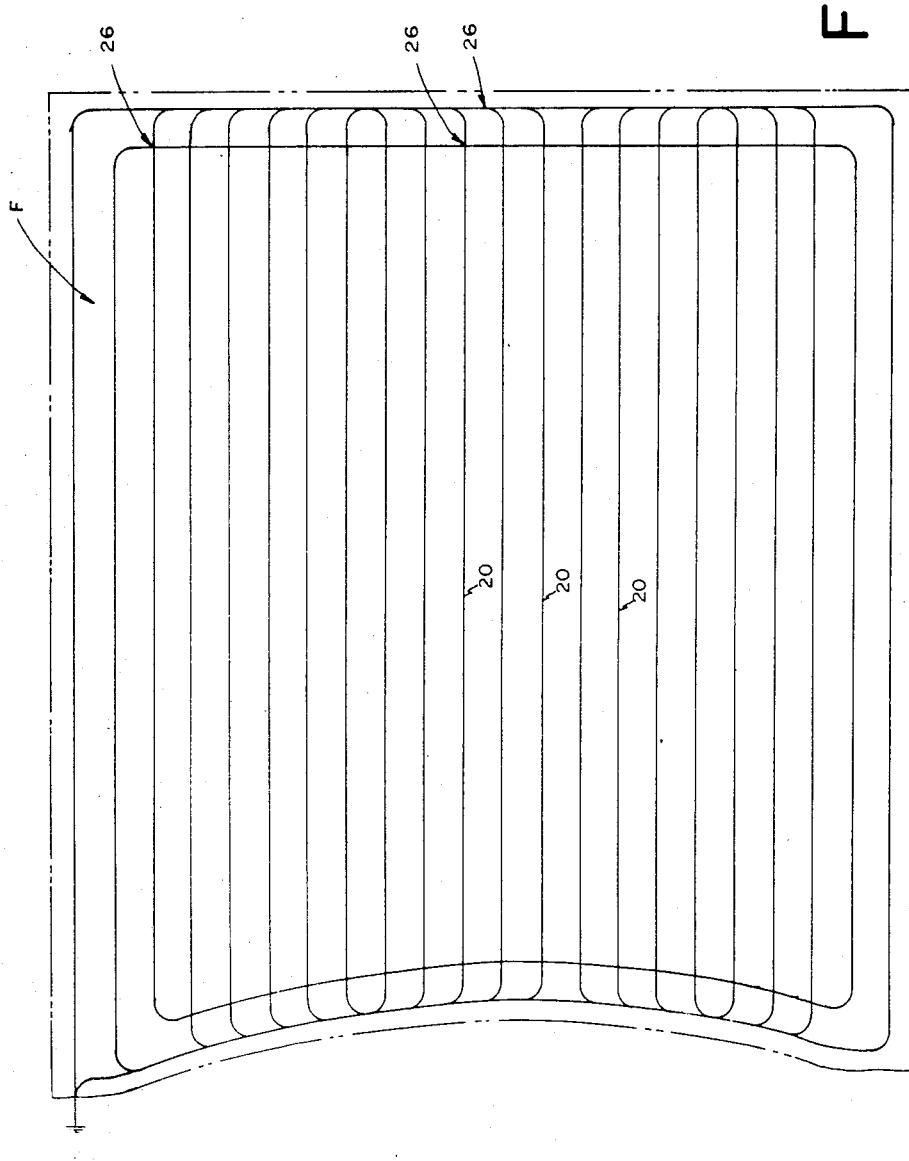

FIG. 6 is a plan profile of the grid layout in a farm field for control means.

FIG. 6A is an exploded view of an intersection for the grid layout of FIG. 6.

Figure 7:
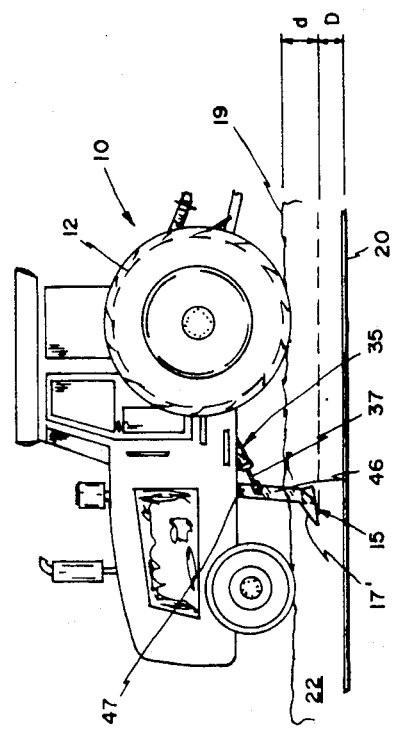

FIG. 7 illustrates another variant of sensor located directly on the prime mover.

Figure 8:
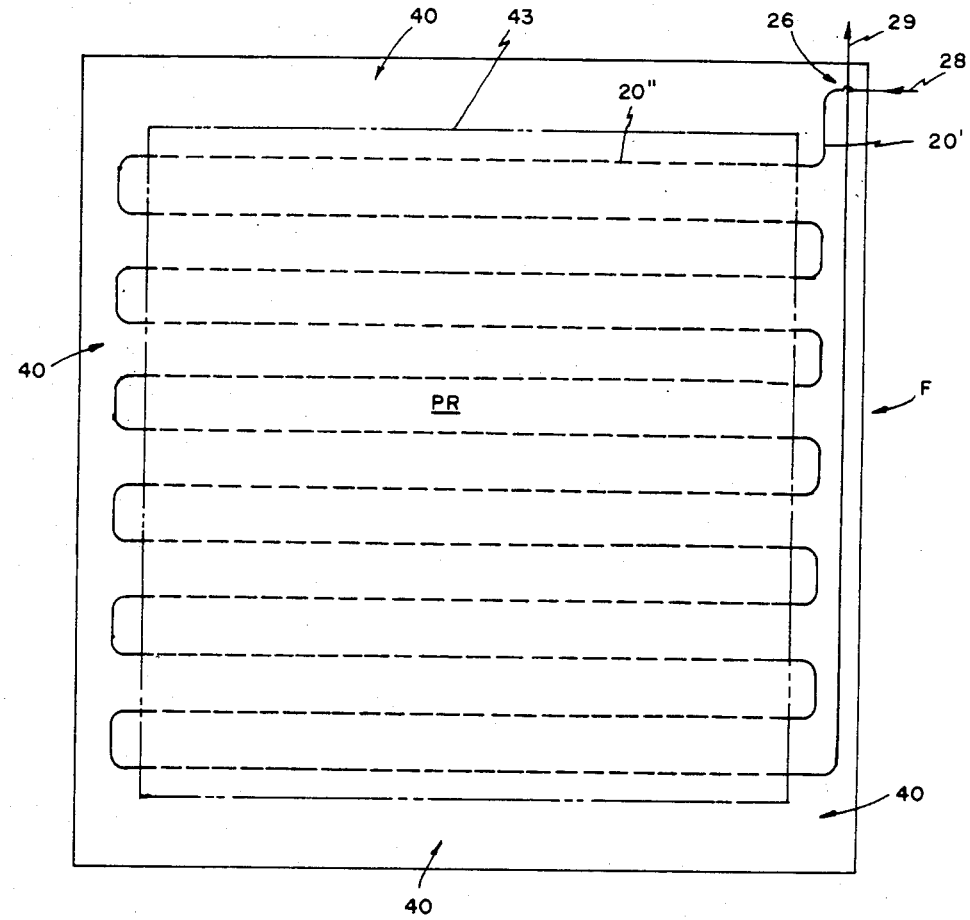

FIG. 8 is an alternate to that of FIG. 6 of a plane profile of the grid layout of a field.

Figure 8A:
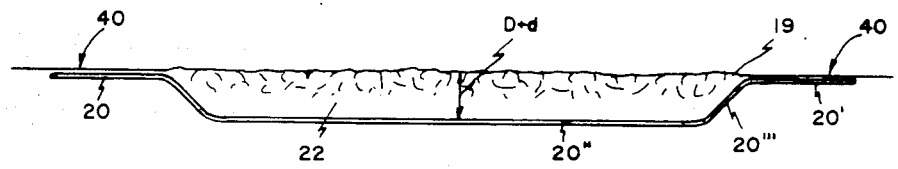

FIG. 8A is a section along a grid line of either FIG. 6 or 8.

Figures 9, 10:
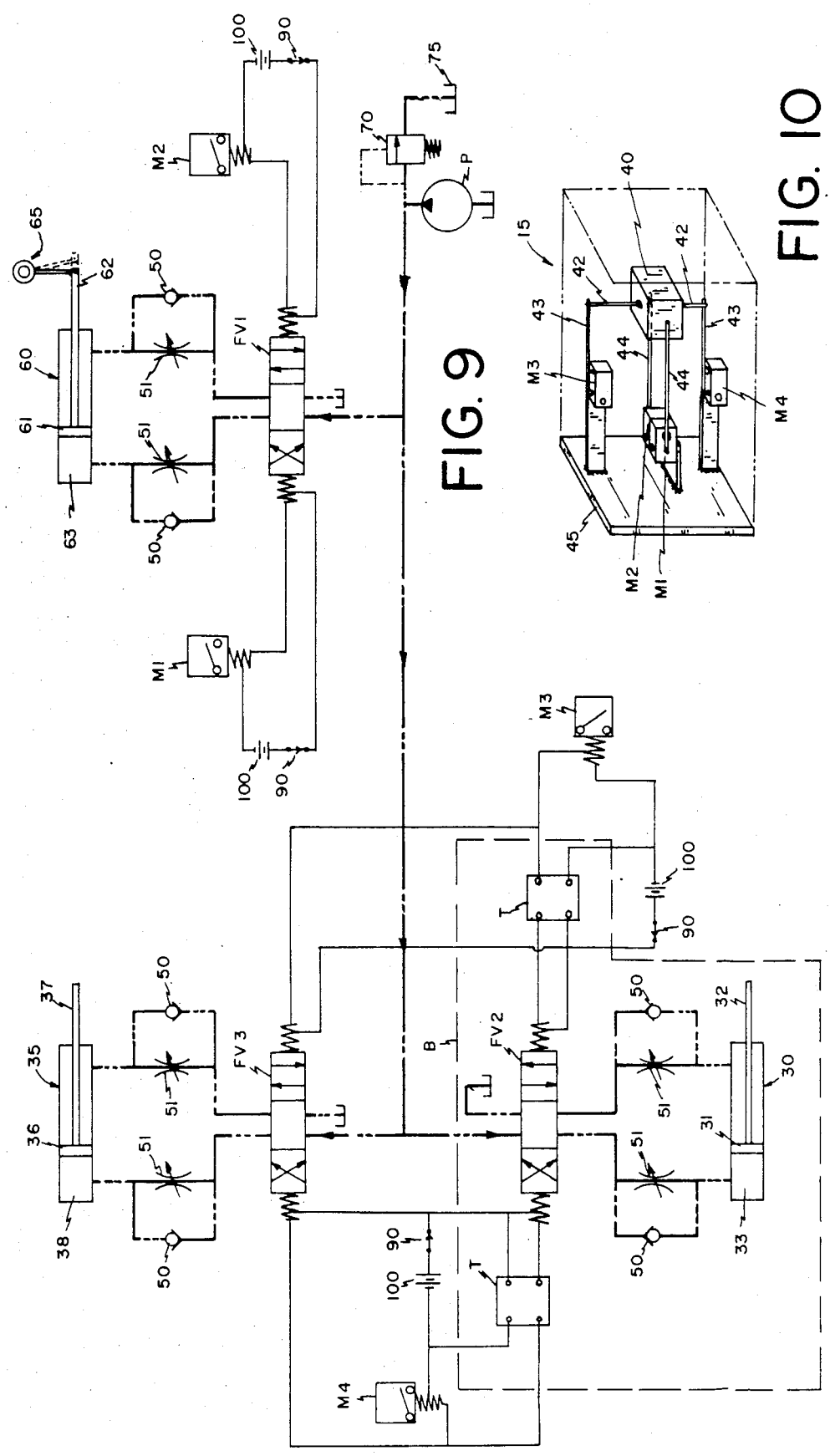

FIG. 9 is the electronic and hydraulic circuit diagram showing an alternative means to control the path of travel and avoiding the need for a microprocessor and also the depth of penetration that is associated with the sensor of FIG. 10.

Figure 11:
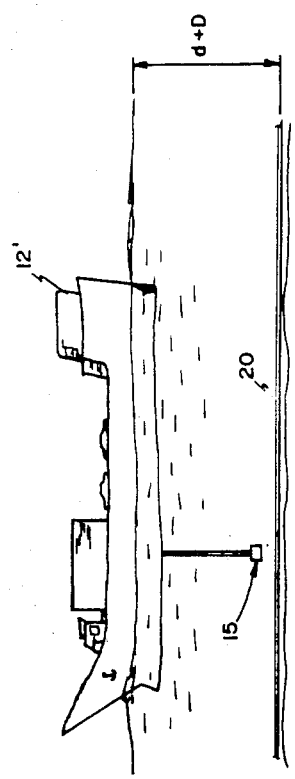

FIG. 11 is an alternative embodiment of use for said sensors, wherein the prime mover is a floating vehicle; one whose effective weight is less than the weight of its displacement in the media of travel (Archimedes principle).

Figure 12:
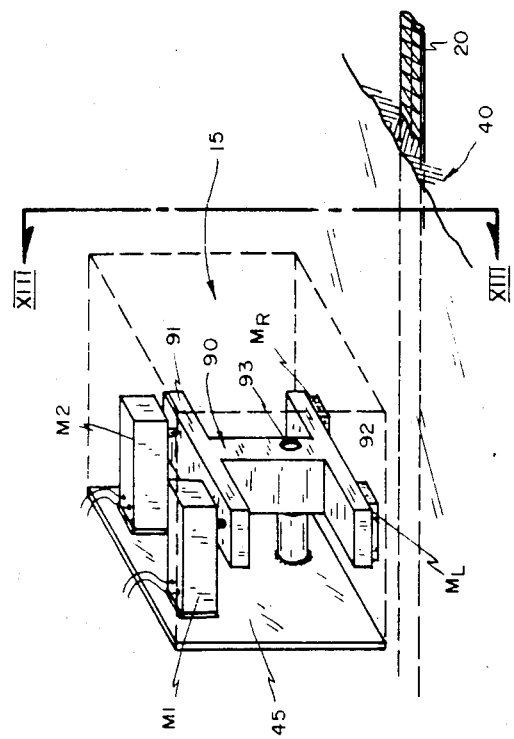

FIG. 12 is a more simplified sensor unit.

Figure 13:
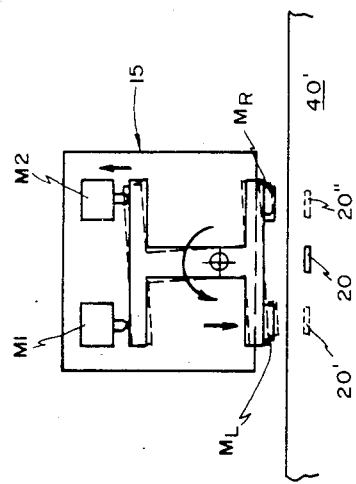

FIG. 13 is a cross-section along lines XIII—XIII of FIG. 12.

Figure 14:
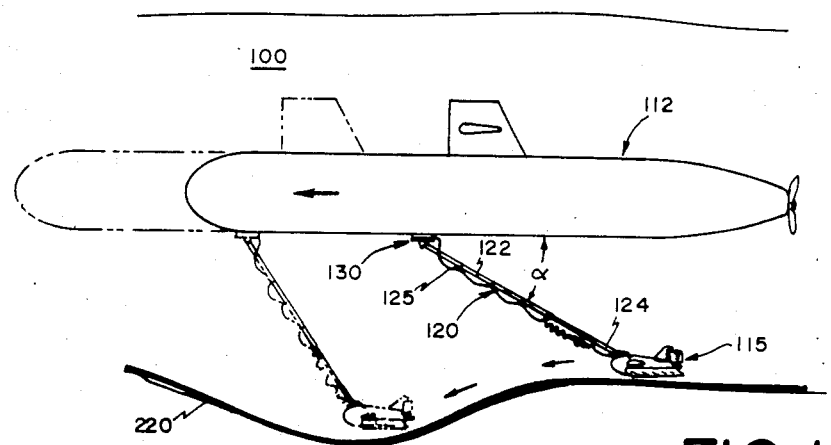

FIG. 14 is an elevational view of a submarine employing a guidance system according to my invention.

Figure 15:
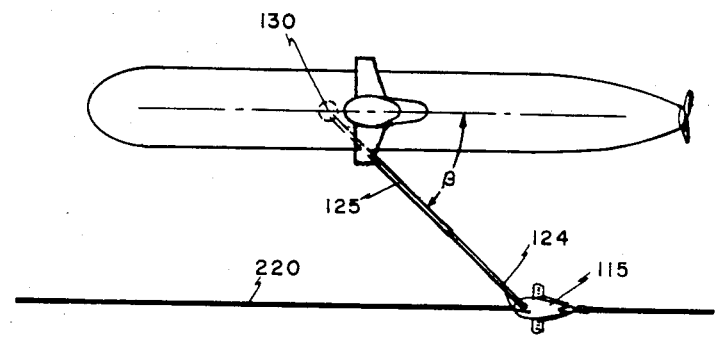

FIG. 15 is a plan view of the submarine of FIG. 14.

Figure 16:
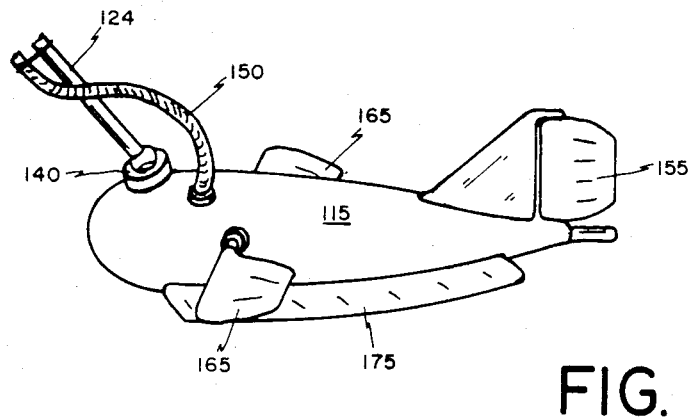

FIG. 16 is a perspective view of the guidance unit housing or drone used with the submarine of FIGS. 14 and 15.

Figure 17:
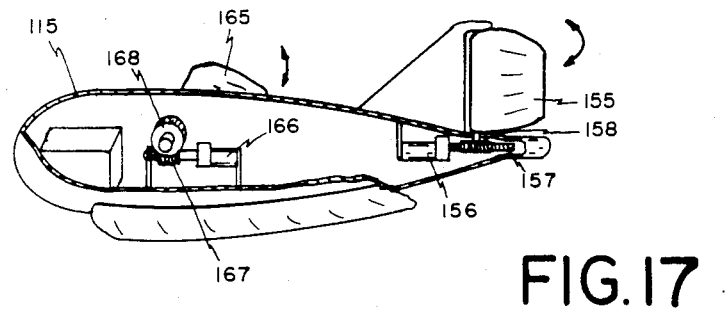

FIG. 17 is a perspective view of FIG. 16 partially in section.

Figure 18:
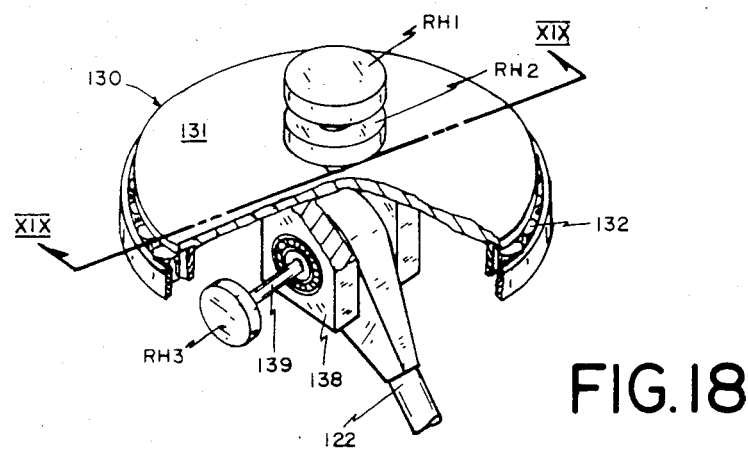

FIG. 18 is a perspective, partially in section, of the guidance unit sensing head.

Figure 19:
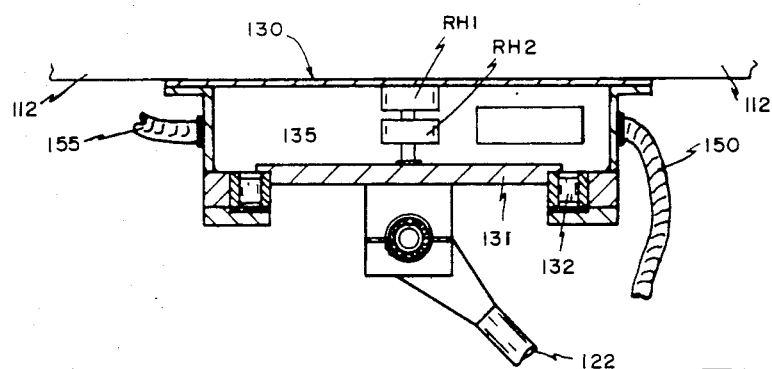

FIG. 19 is a section along XIX—XIX of FIG. 18.

Figure 20:
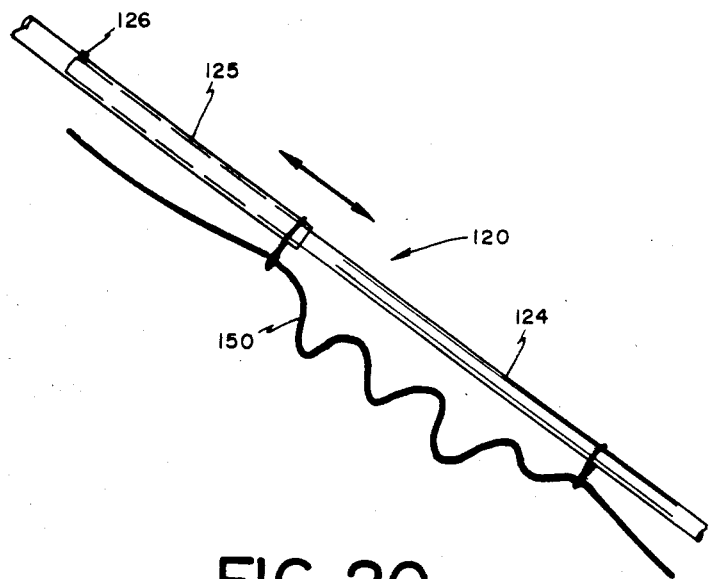

FIG. 20 is a partial elevational view of the telescoping boom for the guidance unit.

Figure 20A:
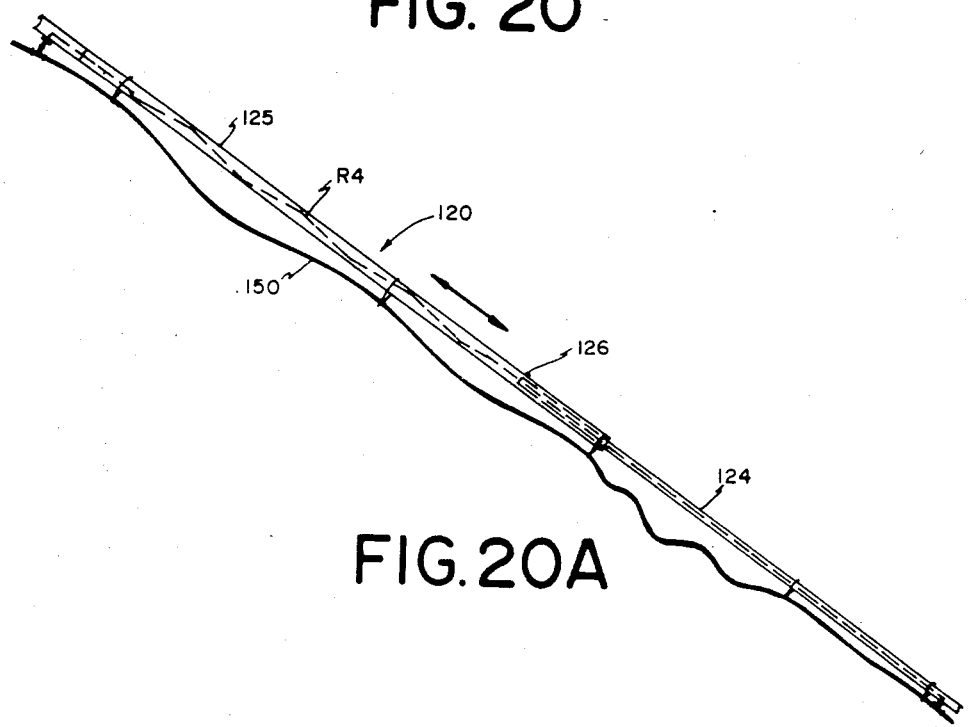

FIG. 20A is the same elevational view as in FIG. 20, boom extended.

Figure 21:
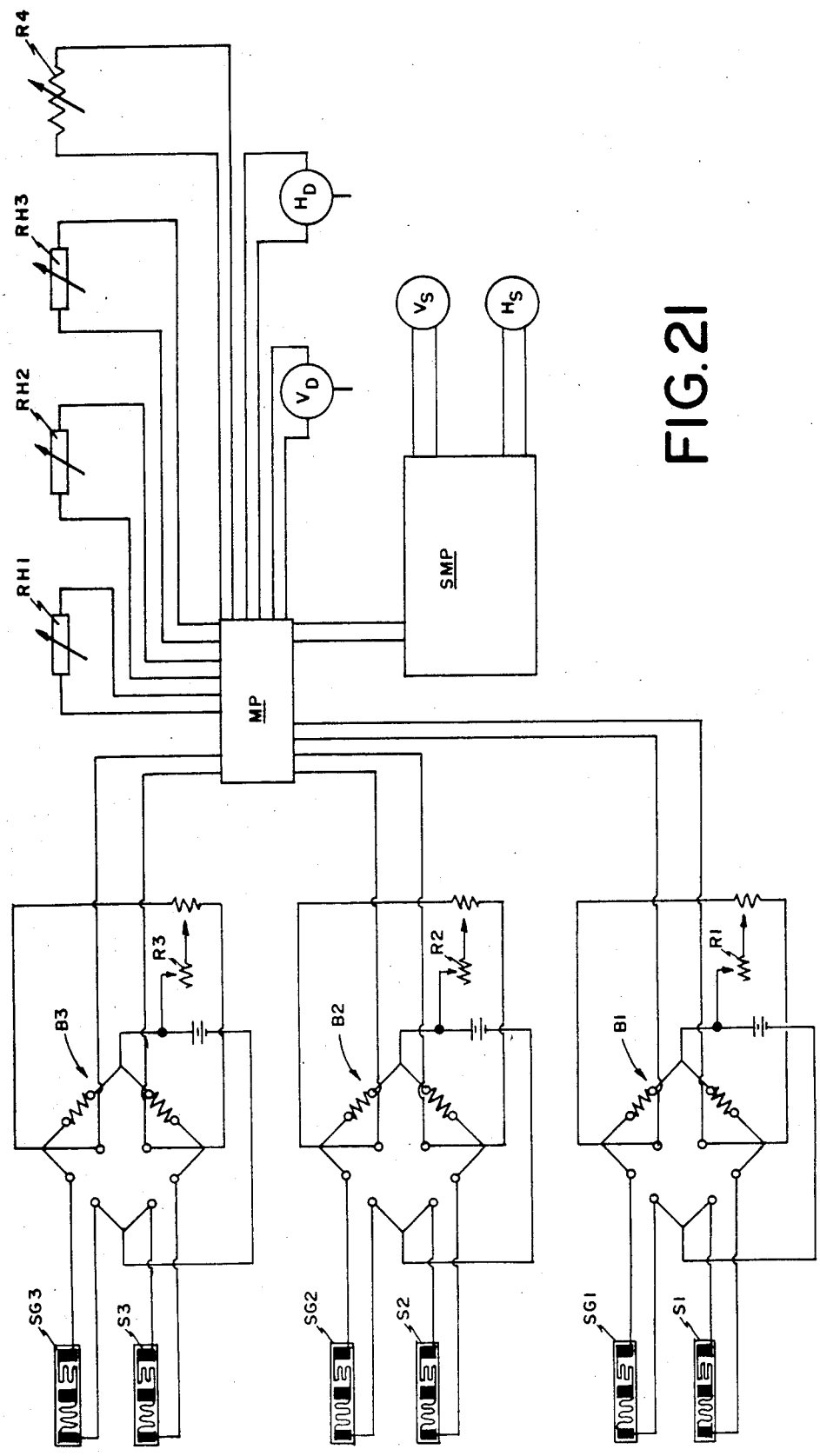

FIG. 21 is an electrical circuit diagram for submarine control.

Referring to FIGS. 1 and 6 in the preferred embodiment, a terrain traveller 10 is illustrated comprising, a prime mover or tractor 12 pulling a passive vehicle such as a plough, disc or the like 14 with depending ground penetrating ploughs 17. Intermediate the tractor 12 and disc or plough means 14 is a sensor box 15 or housing which senses both horizontal location of and the vertical position of a metalic filament or magnetic track 20, which in the preferred embodiment is subterranean relative the upper profile or surface 19 of the ground or terrain 22. The sensor 15 may be mounted as shown as 15 in FIG. 1. The magnetic filament or metalic track 20, which may be composed of a metalic ribbon or magnetic ribbon acts as a sensor control line 20 as will now be explained. On the other hand, the ploughs 17, which do not carry any sensors 15, are designed to penetrate to the depth d, which is a fixed distance D above the sensor control line 20. Thus, hydraulic means 30 is provided to regulate the depth of penetration d, of the discs or plough 17 into the soil so that the fixed distance D relative to the control line 20 is maintained in a manner as will be explained. Thus, if the upper profile of the ground has shifted because of erosion, distance d will vary but distance D will be maintained at a predetermined constant.

The sensor 15 consists of an electromagnet generally indicated at 40 whose attraction to the ferric ribbon or metallic ribbon or ferromagnetic control line 20 is sensed by three strain gauges SG1, SG2 and SG3 each connected to one of its own branches of its own Wheatstone bridge B forming part of the electronic circuitry E of FIG. 5.

Referring to FIG. 5, there are three Wheatstone bridges B1, B2 and B3 having fixed resistors in two of their arms, and strain gauges S and SG, in their other respective arms. A balancing resistor R completes the circuit in order to allow the balancing of the "null" of each of the Wheatstone bridges.

Strain gauges SG1 and SG2 respectively sense the lateral movement of the magnet 40, as is seen in FIG. 3. The magnet 40 moves, for instance, in the direction of the arrows, when the magnetic or ferromagnetic conductor 20 is sensed not to be immediately beneath it. Hence, one of the gauges SG1 is stressed, while the other gauge SG2 is strained. Misbalancing of bridges B1 and B2 takes place and the respective voltages from each bridge B1 and B2 are fed to microprocessor P which thereafter controls hydraulic circuitry H and flow valves FV of FIG. 5.

The electromagnet 40, which in all the figures is illustrated only as a permanent magnet, for simplicity only, is attached to and carried by a horizontal bar 41 which makes connections to a third strain gauge SG3, which through a horizontal member 42 affixes itself rigidly to the case or housing 45 of the sensor 15. The housing 45 is carried by a depending bracket member 46 and is affixed to the undercarriage of the plough 14 as seen in FIG. 1. Each of the strain gauges SG1, SG2 and SG3 has two wires, not referenced, respectively connected, pursuant to the electrical circuit diagram of FIG. 5 to its appropriate Wheatstone bridge B. In order to "sense" and to compensate for ambient conditions, identical strain gauges S1, S2 and S3 are positioned and mounted against the housing 45 as shown in FIG. 2 and they are likewise electrically connected to each one of the other arms of their own Wheatstone bridge B. These latter strain gauges, S, are not strainable or destrainable, but are placed in the environment so that their "drift", because of ambient condition such as temperature are transferred to their Wheatstone bridge in order to attempt to out "balance", drift from the Wheatstone bridge as is caused by ambient conditions and, hence, all the strain gauges SG are identical. Thus, only when the respective strain gauge SG are appropriately stressed or destressed, will a "true" voltage appear across the upper and lower limbs of the Wheatstone bridge, as conventionally known, and a differential signal conveyed to the microprocessor MP for analysis.

Referring now to FIG. 5, and the hydraulic components, H, of that figure, there are two forward, reverse and transfer flow valves FV1 and FV2 which control, in response to the commands provided by the microprocessor MP, hydraulic fluid flows from reservoir 75 via pump P. These valves FV are shown, in FIG. 5, in the neutral and non-communicating positions.

The upper portion of FIG. 5 illustrates a hydraulic cylinder 60 and the lower portion hydraulic cylinder 30, the former cylinder 60 controls steering, the latter cylinder 30, controls the vertical lift of the plough 14 relative to the track 20 and hence the changing depth of penetration d, (maintaining the distance D from the control line 20). Thus, when the bridge B3 is out of balance, and depending upon which way it is out of balance, the microprocessor MP will cause the flow valve FV2 to step and to cause hydraulic fluid to flow into the piston 30 causing it to extend and, hence, to "lift" the discs or ploughs 17 (to diminish the distance d) or, alternatively, to "penetrate" and to increase the distance d. Typically, therefore, the hydraulic cylinder 30 is communicated to, on opposite sides of its movable piston 31 with flow control branches each consisting of a free flow valve, 50, only in one direction, and a metering valve 51, parallel therewith. When either of the flow valves FV are caused to be moved laterally, either left or right, in response to the command from the microprocessor MP, cylinders 60 or 30 will move, to extend or to contract in a responding manner.

Referring now to cylinder 30, it consists of the piston 31 and cylinder rod 32 which, as seen in FIG. 1, attaches itself directly to the idler wheel 18 of the plough 14, while the housing 33 of the cylinder 30 is welded to the upper framework of the plough 14. The housing 33 communicates on opposite sides of the piston 31 to equivalent pairs, in parallel, of the one way flow valve 50, and a metering valve 51 which generally, when the flow valve FV2 is not activated, feeds to the "neutral" position of that valve as illustrated in FIG. 5. When the microprocessor MP causes the valve FV2 to move, hydraulic fluid is pumped to one side of the piston 31 and drained from the other through the metering valve 51 of the opposite branch. Instant "filling" of the appropriate side is achieved by the one way flow valve 50, while "slow drain" of the opposite side takes place because of the metering valve 51 in that limb. Thus, in the embodiment illustrated, depending upon the voltage output of Wheatstone bridge B3, in response to the strain placed on strain gauge SG3 by the magnet 40, the microprocessor MP will cause the fluid flow valve FV2 to be positioned in such a manner as to locate the piston rod 32 in such a position to place the ploughs 17 at the appropriate and predetermined fixed distance D from the underlying control track 20.

Similarly, the equivalent cylinder 60 consists of a movable piston 61, with extending piston rod 62, and housing 63, making appropriate fluid connection through one way valves 50 and metering valves 51 to flow valve FV1. That flow valve FVI is controlled by the microprocessor MP in response to the voltage output of bridges B1 and B2 that respond to the strain and stress on respective strain gauges SG1 and SG2 depending upon the lateral position of the tractor 12 over the track 20. Since the rod 62, is attached to the steering system (not clearly shown in any of the figures) or servo-mechanism or solenoid actuators, of the tractor 12, the tractor will track along and, thus be steered along and over the underlying track 20.

If the wire 20, and referring to FIG. 6, is laid out as shown beneath the surface of the ground 19 of a field 25, there are grid intersections 26, but the tractor 12 may be caused to plough the field F and will track along the gridwork 20 and traverse the intersections 26 if the grid is laid out in a manner similar to that as shown in FIG. 6.

Referring to FIG. 6A, in order to "sense" turning locations and intersections 26, standard iron bars CB are placed near the radius of curvature "r" and where a double standard iron bar CB is used, a double "pulse" is generated by all Wheatstone bridges B1, B2 and B3 as the sensor 15 travels over them, and these pulses are conveyed to the processor P, which according to its preprogramed memory will determine whether a "turn" should take place along radius r from track 20' to track 20₁. In this way, and referring to FIG. 6, a complete field F, using the simple expedient of crossing filament tracks 20 can be ploughed when that track 20 is subterraneanly located.

Where the path of travel of the vehicle, other than a tractor, is required, and there is no "ploughing" to take place, the track may be located upon the surface of the ground whether it be paved or not. In such a way, therefore, and using only one Wheatstone bridge and two sensors, say SG1 and S1, the path of a motor vehicle such as an automobile, along a highway may be simplistically controlled.

In another embodiment, and referring to FIGS. 7 through 10, the sensor means 15 may be located on the prime mover vehicle 12 itself via a plough 17' or the like so as to extend below the vehicle to wit; in this embodiment, to penetrate into the ground, and includes means for regulating the instance of penetration of the furrow 17' as, for example, by a simple expedient of a hydraulic cylinder 35. In that respect, the plough 17' is carried by a vertical member 46 that is appropriately hinged at 47 to the tractor 12 for pivotal movement relative thereto. In such an environment, the tractor 12 can pull a passive trailer, for instance, spraying equipment, or harvesting machinery, along the predetermined path 20 of FIG. 6, or that of FIG. 8, as the case might be, and still use the same guide control grid or path; namely, the subterranean track 20 of either of said figures.

Referring to FIGS. 8 and 8A and to a simpler grid layout for the track 20, it may follow a general undulating path in plan view, from a start point 28 located on the surface 19 of the ground 22, to an exit point 29, also located on the surface 19 of the ground, so that there is a minimum of track crossover points 26 eg. only one. In this embodiment, about the field F, is a perimeter road 40 that borders an edge 43 defining a ploughable region, PR, in which cultivars may be grown. The track 20, exterior of the ploughable region, PR, and hence on the perimeter of road 40, is placed on the surface 19 to form a track segment 20' while in the ploughable region, PR, the track 20 transcends quickly down a transition path 20''' to the subterranean depth (D+d) as at 20'' of FIG. 8A (this is shown as dotted lines 20 in FIG. 8). When this type of grid configuration and layout is used, the sensor 15 must itself track at a predetermined precise elevation, the track 20, that is the fixed distance D (and also the "variable" distance d) and, hence, the need for the pivoting arm 46 and the operationally movable cylinder 35 of FIG. 7 so that the plough 17' and its containing (or encapsulated) sensor 15 may be positioned at the given distance D above the track 20 irrespective of whether the track 20 is on the surface 19 as at 20', or fixedly, at a predetermined distance (d+D), below the surface as at 20'' or negotiating the transition path 20''' therebetween. The control circuitry as earlier described in relation to FIG. 5 could be used for such operation.

Alternatively, and eliminating the need for the microprocessor MP, reference will now be made to FIGS. 9 and 10. Particularly, referring to FIG. 10, the sensor 15 is contained within the housing 45 and consists, once again, of a magnet 40 (electromagnet or permanent), that is suspendedly constrained in the vertical and horizontal planes or positions by respective vertical members 42 and horizontal members 44. The horizontal members 44 attach themselves to independant laterally moving switch arms of two horizontally poised microswitches M1 and M2 so as to sense the lateral migration of the magnet 20 from a predetermined norm. Similarily, there are vertically positioned microswitches M3 and M4 also carried by the housing 45 as shown in that figure whose vertically moving switch arms respectively extend into the horizontal members 43, that make terminal rigid connection to each of the vertical members 42. These latter two microswitches M3 and M4 sense the relative vertical position of the magnet 40. It will be appreciated that the magnet 40 will move vertically in response to the vertical proximity of the sensor track 20 and also move laterally in response to the lateral location of the track 20. When these microswitches M1 through M4 are appropriately connected in an electrical and hydraulic configuration analagous to that illustrated in FIG. 9; a manner somewhat similar to that disclosed with reference to FIG. 5, the steering cylinder 60 will cause the movement of the piston rod 62 and, hence, "steer" the steering linkage 65 which will track the prime mover 12 along the undulating path of travel of the track 20.

The vertically sensing microswitches M3 and M4 will sense and control the two cylinders 30 and 35. In the embodiment of FIG. 7, only the cylinder 35 is utilized to move the piston rod 37 of that cylinder 35 and, hence, the plough 17' into and out of penetrating engagement with the ground 22 so as to maintain a fixed relation, distance D, above the track 20.

In FIG. 9, the control circuitry of the implement lifting cyinder 30 is contained within the box B. Thus, it will be seen that the embodiments of FIGS. 7 and 1 could be combined so as to provide a sensor control, either on the plough, or trailing vehicle as shown in FIG. 1, or, as shown in FIG. 7; the plough or trailing vehicle not being illustrated in FIG. 7 for reasons of simplicity.

Also referring to FIG. 9, there are a number of circuit breakers 90 illustrated, each connected to the common battery source 100 (which could be the prime mover main battery), so that the sensor 15 is activated when the switches 90 are in the closed position as shown in that figure. When they are open, the circuit is inoperative. The prime mover then may be used; in the conventional manual manner, by a human to drive and steer the tractor.

Further, when the embodiment of FIG. 7 is used to pull the plough of FIG. 1, it is necessary that there be some "timers" which would control, that is to delay, penetration and withdrawal of the ploughs 17 of FIG. 1 into the soil after the sensor 15, contained in the plough 17', has sensed the change in elevation of the track 20 as along transition gradient 20''' between the surface 20' and the subterranean location 20''. These timers, T, in FIG. 9 are placed in the circuit with the microswitches M3 and M4 to appropriately control the response of the cylinder 30 as required.

It will be apparent, now to those skilled in the art that if, in fact, the primer mover of FIG. 7 were, in fact a boat or other water floating vehicle, and the grid pattern or path of FIG. 6 or 8 were, in fact, a grid pattern or path placed in a water media, as on the floor of a seabed, the plough 17' of FIG. 7, would suspend from the bottom of the boat and, instead of a steering mechanism for wheels, there would be a steering mechanism for a rudder of a boat, thus FIG. 11.

Those skilled in the art will know that the flow valves, FV, are what are colloquially known as electrically operated hydraulic direction control valves, three position, spring centered.

The simplified sensor of FIGS. 12 and 13 may be used where a vehicle travels over a surface 40'. The metalic or magnetic track, in ribbon form 20 is disposed to define the path of travel for the vehicle and may be embedded into the surface as shown. The sensor 15 consists of a rocker 90 with a cross-sectional shape in the form of an "I" beam with an upper rocker member 91 and a lower rocker member 92. The rocker 90 pivots about a pin or pivot point 93 which is a shaft protruding from the housing 45 of the sensor 15. Depending from the lower rocker members 92 are two magnets, oppositely disposed, respectively magnets $M_l$ and $M_r$. Superadjacently disposed, above rocker member 91 are two microswitches M1 and M2. If perchance the vehicle moves to the right, and referring to FIG. 13, magnet $M_l$ finds itself above the track 20 (and for purposes of illustration, it is shown that the track is in the apparent position 20'). As a result the rocker 90 will rotate counterclockwise and close microswitch M2. It will be obvious, therefore, that when the vehicle is moved to the right so that the magnet $M_r$ is over the track 20 and hence, in the apparent position 20'', counterclockwise rotation of the rocker 90 will occur and microswitch M2 will open and M1 will close. By appropriate circuitry, synonymous with that illustrated in FIGS. 5, 9 or 10 or any apparent variation thereof the vehicle may be controlled to travel along the path 20.

The advantages to the simplified sensor of FIGS. 12 and 13 is that it provides simple sensing, at a very reduced cost, and is to be preferred in a number of more simplistic applications.

Referring now particularly to water travelling vehicles and to a submersible submarine and to FIG. 14, a submarine 112 is submersible in the ocean 100 and pulls a drone, a sealed guidance unit 115 at the distal end of an articulating and telescoping boom 120. The upper portion of the boom 120 is attached for pivotable connection to the underside of the submarine through a pitch, roll and yaw sensing head 130, while the lower distal end of the boom 120 attaches through a bearing head 140 to the sensing unit housing 115. The boom 120, itself may be cylindrical and its lower portion 124 can slide into its upper portion 125, thereby providing a variable length boom. Referring to FIG. 20, a stop means 126 is provided so as to stop penetrating telescoping movement of the lower boom member 124 into the upper boom member 125 as required. An ambilical cord 150 which conveys tracking and guidance information between the guidance unit 115 and the submarine 112 is suspended along the boom and will be described in greater detail hereafter.

Along the floor of the sea is a metalic filament or magnetic track 220 over which control unit 115 travels in a manner as earlier explained in relation to the earlier embodiments.

Referring to FIG. 16, the guidance unit housing 115 has a rear articulating or tail fin 155, lateral articulating flap fins 165, and a fixed lower depending pectoral fin 175. The rear fin 155 directs the path of travel of the guidance unit 115 over the metalic track 220 and the lateral fins 165 maintain the guidance unit 115 at a predetermined distance from submersible track 220 in a manner as will become apparent.

Referring to FIG. 17, the tail fin 155 is driven by a reversible DC motor 156 having a worm sector steering system with a worm gear 157 and a worm sector gear 158 travelling thereon to turn the fin 155 left or right depending upon the relative lateral position of the sector gear 158 on the worm gear 157.

Similarily, the lateral fins 165 are driven up and down by a reversible DC motor and by a similar worm and sector arrangement 167 and 168.

On the belly of the submarine 112 is a pitch, roll and yaw sensing head 130 that consists of a swivel plate 131 which is adapted to roll around in a channel and race 132 that is carried by the body of the submarine 112. A pair of variable resistors RH1 and RH2 coaxially mounted with a common shaft 135 are affixed to the floor 131 which is adapted to rotate, on the race and channel 132 whereby to allow to boom 122 to seek relative lateral angle $\beta$ depending upon the relative position of the submarine 112 via a vis the sensing unit 115 as illustrated in FIG. 13. The upper member 122 of the boom 125 pivotally mounts in a pivot means 138 to which a shaft 139 of a third variable resistor RH3 is affixed. Depending upon the relative angle, $\alpha$, of the boom vis a vis the submarine 112, see FIG. 12; the resistor RH3 will find its own resistance. Inside the boom and referring to FIG. 20A, is a stain gauges resistance R4 on a potentiometer which, depending upon the relative telescoping position of the boom, varies the resistance in strain gauge resistor R for means providing measurement as to the precise length of the boom.

Referring now to the circuit diagram of FIG. 21, the microprocessor MP is located in the drone 115, and controls the horizontal and vertical fins of the drone so that the drone 115 is constantly positioned over the submerged cable 220 in a manner as illustrated in FIGS. 14 and 15. Thus, the drone itself contains, in a like manner as described with reference to FIG. 5, strain gauges S1 and SG1; S2 and SG2; S3 and SG3; Wheatstone bridges and the like which convey the actual data of the sensor within the drone, equivalent to that of FIGS. 2 and 3 for determining the relative position of the drone over the cable. Resulting voltages are fed into the microprocessor MP located in the drone. Simultaneously, it is necessary to determine pitch, roll and yaw at the sensing head 130 and hence the values of the resistors RH1, RH2 and RH3 are also fed into the microprocessor MP by means of the umbilical cord 150. Also the relative distance of extension of the boom 124 is required and hence the resistance of the strain resistor R4. Values, therefore, of these latter 4 resistors will determine the angle $\alpha$, the angle $\beta$, and the relative distance of the drone from the submarine. These values are computed by the microprocessor MP and the microprocessor MP activates the vertical and horizontal fins (respectively indicated as $V_d$ and $V_h$ in FIG. 21) by activating the reversible DC motors 156 and 166. The computed information from the microprocessor MP is fed back, up the umbilical cord 150 to the submarine microprocessor SP whereby to control the submarine horizontal and vertical attitudes by appropriate circuitry indicated in FIG. 21 as $V_s$ and $V_h$.

The submarine microprocessor SMP may be controlled, as those skilled in the art may wish to place the submarine at a given elevation relative to the sea bottom and hence the drone will drift at a predetermined distance above the submarine cable 220 as illustrated in the phantom portion of FIG. 14.

Those skilled in the art will also now appreciate, that the submarine, in fact, could be riding on top of the surface of the ocean 100, rather than submerged therein as illustrated in FIG. 14 without significantly deviating from the embodiments of the invention so long as the boom length of the boom 120 can be extended sufficiently so that the drone 115 will be within sensing distance of the filament 220.

It should now be appreciated that other variations of the invention may be achieved without deviating from the invention as claimed. It will also be appreciated that other variations of this invention may take place without deviating from the embodiments as claimed.

The embodiments of the invention in which an exclusive property or privilege is claimed are defined as follows:

1. A vehicle control system comprising
   (a) a filament of metalic material adapted to be positioned in juxtaposition with the travelling surface, so as to trace out a predetermined course of travel;
   (b) a prime mover mounted in a vehicle adapted to travel over the surface and having means for steering the same to follow said course of travel;
   (c) a magnetic means mounted in a housing interconnected with the vehicle, that is magnetically responsive to the location of the said filament;
   (d) a first position sensing means, affixed to the magnetic means, and mounted in the housing for sensing lateral positioning, relative to the housing of said magnetic means;
   (e) first means responsive to the first position sensing means for driving said means for steering whereby to direct the travelling path of the prime mover in parallel to the path or course of the metalic filament,
   (f) a second position sensing means attached to the magnetic means, and attachedly mounted to the housing for sensing the vertical position, relative to the housing, of said magnetic means; and,
   (g) second means responsive to the second position sensing means for maintaining the second position sensing means at a predetermined distance, in elevation, relative to said filament.

2. The control system as claimed in claim 1, wherein the filament of metalic material is a magnetic filament.

3. The control system as claimed in claim 1, wherein the magnetic means is an electromagnet.

4. The vehicle control system as claimed in claim 1, wherein the housing containing the magnetic means and said first and second position sensing means is carried by an earth penetrating implement.

5. The vehicle control system as claimed in claim 4, wherein the earth penetrating implement is carried by the prime mover.

6. The vehicle control system as claimed in claim 4, including a passive trailing vehicle attached to and pulled by the prime mover, said passive vehicle carrying the said earth penetrating implement.

7. The vehicle control system as claimed in claim 1, 2 3, 4, 5 or 6, wherein the first position sensing means includes at least one strain gauge attached for stress in response to the relative position of the magnetic means, and electrically connected as one arm of a Wheatstone bridge, voltage means applied across a first pair of arms of said bridge, a pair of conductors connected across and opposite a second pair of said arms of said bridge, said pair of conductors communicating the voltage across said second pair of said arms to a microprocessor, programmed to respond to said voltage and means connecting the said microprocessor to a fluid control valve including forward, reverse and neutral hydraulic conduits, a source of hydraulic fluid flow communicating to the flow valve, and a pair of hydraulic conduits on opposite sides of the flow valve communicating to observe sides of a movable piston with rod defined by a first hydraulic cylinder, whereby, when the voltage across the second pair of said arms in the Wheatstone bridge has a polarity in one direction, the said rod is caused to move in a first direction and when the said voltage polarity is of opposite polarity the said rod moves in the direction opposite to said first direction, the rod attached to said steering means of the prime mover to thereby control the path of travel of the vehicle along said filament.

8. The vehicle control system as claimed in claim 1, 2 3, 4, 5 or 6, wherein the first position sensing means includes a microswitch with two poles, each with a single throw arm, each throw arm fixedly attached to the magnetic means, whereby the relative lateral position of the magnetic means to the housing controls physical location of the throw arm and one of said poles is connected to an electrical source of power on the one hand, and a fluidic member as a solenoid activated fluidic control valve including forward, reverse and neutral hydraulic conduits, a source of hydraulic fluid flowingly communicating to the control valve, and a pair of hydraulic conduits on opposite sides of the control valve communicating to obverse sides of a movable piston with rod defined by and slidingly travelling in a first hydraulic cylinder, whereby when one of the throw arms makes electrical connection with its pole, the voltage is supplied by the electrical source to the solenoid to activate the fluidic member in one direction, and to cause fluid to flow into the said cylinder, hence moving the rod in a first direction, and when the throw arm of the second pole makes electrical connection with its pole, the voltage is supplied by the electrical source to the solenoid to activate the fluidic member in the direction opposite said one direction by causing fluid to flow into the cylinder in said opposite direction, hence, moving the rod in a direction opposite said first direction, the rod attached to said steering means of the prime mover to thereby control the path of travel of the vehicle along said filament.

9. The vehicle control system as claimed in claim 1 wherein the position sensing means each include at least one strain gauge attached for stress in response to the relative position of the magnetic means, and electrically connected as one arm of a Wheatstone bridge, voltage means applied across a first pair of arms of said bridge, a pair of conductors connected across and opposite a second pair of said arms of said bridge, said pair of conductors communicating the voltage across said second pair of said arms to a microprocessor, programmed to respond to said voltage and means connecting the said microprocessor to a fluid control valve including forward, reverse and neutral hydraulic conduits, a source of hydraulic fluid flow communicating to the flow valve, and a pair of hydraulic conduits on opposite sides of the flow valve communicating to obverse sides of a movable piston with rod defined by a first hydraulic cylinder, whereby, when the voltage across the second pair of said arms in the Wheatstone bridge has a polarity in one direction, the said rod is caused to move in a first direction and when the said voltage polarity is of opposite polarity the said rod moves in the direction opposite to said first direction, said rod associated with said first position sensing means being attached to said steering means of the prime mover to thereby control the path of travel of the vehicle along said filament, said rod associated with said second position sensing means causing said housing and said magnetic means to be moved vertically for maintaining the magnetic means at a predetermined elevation relative to the filament.

10. The vehicle control system as claimed in claim 1, 2 or 3, wherein the vehicle is a ground travelling vehicle.

11. The vehicle control system as claimed in claim 1, 2 or 3 additionally including; with two poles, each with a single throw arm, each throw arm fixedly attached to the magnetic means, whereby the relative lateral position of the magnetic means to the housing controls the physical location of the throw arm and one of said poles is connected to an electrical source of power on the one hand, and a fluidic member as a solenoid activated fluidic control valve including forward, reverse and neutral hydraulic conduits, a source of hydraulic fluid flowingly communicating to the control valve, and a pair of hydraulic conduits on opposite sides of the control valve communicating to obverse sides of a movable piston with rod defined by and slidingly travelling in a first hydraulic cylinder, whereby when one of the throw arms makes electrical connection with its pole, the voltage is supplied by the electrical source to the solenoid to activate the fluidic member in one direction, and to cause fluid to flow into the said cylinder, hence moving the rod in a first direction, and when the throw arm of the second pole makes electrical connection with its pole, the voltage is supplied by the electrical source to the solenoid to activate the fluidic member in the direction opposite said one direction by causing fluid to flow into the cylinder in said opposite direction, hence, moving the rod in a direction opposite said first direction, said rod associated with said first position sensing means being attached to said steering means of the prime mover to thereby control the path of travel of the vehicle along said filament, said rod associated with said second position sensing means causing said housing and said magnetic means to be moved vertically for maintaining the magnetic means at a predetermined elevation relative to the filament.

* * * * *